US009391951B2

(12) United States Patent
van Bemmel

(10) Patent No.: US 9,391,951 B2
(45) Date of Patent: Jul. 12, 2016

(54) COMMUNICATION NETWORK WITH DISTRIBUTED NETWORK ADDRESS TRANSLATION FUNCTIONALITY

(71) Applicant: Alcatel-Lucent Canada Inc., Ottawa (CA)

(72) Inventor: Jeroen van Bemmel, Calgary (CA)

(73) Assignee: Alcatel Lucent, Boulogne-Billancourt (FR)

( * ) Notice: Subject to any disclaimer, the term of this patent is extended or adjusted under 35 U.S.C. 154(b) by 386 days.

(21) Appl. No.: 14/013,725

(22) Filed: Aug. 29, 2013

(65) Prior Publication Data

US 2015/0063363 A1 Mar. 5, 2015

(51) Int. Cl.
*H04L 29/12* (2006.01)
*H04L 29/06* (2006.01)

(52) U.S. Cl.
CPC .......... *H04L 61/251* (2013.01); *H04L 61/2532* (2013.01); *H04L 61/6004* (2013.01); *H04L 69/167* (2013.01); *H04L 61/2592* (2013.01); *H04L 63/0254* (2013.01); *H04L 63/0272* (2013.01)

(58) Field of Classification Search
None
See application file for complete search history.

(56) References Cited

U.S. PATENT DOCUMENTS

| | | | | |
|---|---|---|---|---|
| 2002/0073215 A1* | 6/2002 | Huitema | ................. | H04L 29/06 709/230 |
| 2003/0219023 A1* | 11/2003 | Miyata | .............. | H04L 29/12358 370/395.53 |
| 2004/0107287 A1* | 6/2004 | Ananda et al. | .... | H04L 29/12009 709/230 |
| 2004/0233916 A1* | 11/2004 | Takeuchi | .......... | H04L 29/12066 370/395.54 |
| 2004/0246991 A1* | 12/2004 | Tsuzuki | ............ | H04L 29/12358 370/466 |
| 2006/0209831 A1* | 9/2006 | Shepherd | ............ | H04L 12/4641 370/392 |
| 2006/0233175 A1* | 10/2006 | Ge | .......................... | H04L 45/04 370/392 |
| 2006/0251088 A1* | 11/2006 | Thubert | .............. | H04L 12/2898 370/401 |
| 2008/0080519 A1* | 4/2008 | Park | .................. | H04L 29/12066 370/395.54 |
| 2012/0005299 A1* | 1/2012 | Xu | .................... | H04L 29/12358 709/208 |
| 2012/0311660 A1* | 12/2012 | Park | .................... | H04L 41/0893 726/1 |

OTHER PUBLICATIONS

D. Freedman, "OSPF Version 2 as the Customer Edge/Customer Protocol for BGP/MPLS IP VPNs," Internet Engineering Task Force, Internet-Draft, draft-freedman-l3vpn-ospf2-4364-ce-01, Jul. 2012, 14 pages.

(Continued)

*Primary Examiner* — Robert M Morlan
(74) *Attorney, Agent, or Firm* — Ryan, Mason & Lewis, LLP

(57) ABSTRACT

In one embodiment, a first network device is configured for communication with at least a second network device, and implements a gateway. The gateway may comprise, for example, a software gateway. The gateway is configured to receive a packet in a format of a first protocol and to determine if the packet includes an identifier of the gateway, for example, encoded within a destination address of the received packet. If the received packet does not include the gateway identifier, the packet is forwarded in the format of the first protocol. If the received packet does include the gateway identifier, a network address translation operation is applied to reconfigure the packet in a format of a second protocol different than the first protocol, and the reconfigured packet is forwarded in the format of the second protocol. The first and second protocols may comprise Internet protocols such as IPv6 and IPv4, respectively.

26 Claims, 6 Drawing Sheets

(56) References Cited

OTHER PUBLICATIONS

J. De Clercq et al., "BGP-MPLS IP Virtual Private Network (VPN) Extension for IPv6 VPN," Internet Engineering Task Force, Network Working Group, Request for Comments: 4659, Sep. 2006, 18 pages.

E. Rosen et al., "Multicast in MPLS/BGP IP VPNs," Internet Engineering Task Force, Network Working Group, Request for Comments: 6513, Feb. 2012, 88 pages.

E. Rosen et al., "BGP/MPLS IP Virtual Private Networks (VPNs)," Internet Engineering Task Force, Network Working Group, Request for Comments: 4364, Feb. 2006, 47 pages.

* cited by examiner

COMMUNICATION NETWORK WITH DISTRIBUTED NETWORK ADDRESS TRANSLATION FUNCTIONALITY

FIELD

The field relates generally to communication networks, and more particularly to communication protocols implemented using network devices of such networks.

BACKGROUND

Communication service providers often implement Virtual Private Networks (VPNs) for their customers. For example, VPNs may be provided using Internet Protocol (IP), Border Gateway Protocol (BGP) and Multiple Protocol Label Switching (MPLS) in accordance with the techniques disclosed in Internet Engineering Task Force (IETF) Request for Comments (RFC) 4364, entitled "BGP/MPLS IP Virtual Private Networks (VPNs)," which is incorporated by reference herein. The companion standard for VPNs in IPv6 networks is RFC 4659, entitled "BGP-MPLS IP Virtual Private Network (VPN) Extension for IPv6 VPN," which is also incorporated by reference herein. IP VPN services based on RFC 4364 and RFC 4659 have been deployed extensively by service providers around the world.

VPNs configured in accordance with RFC 4364 and RFC 4659 connect customer sites via tunnels, and allow IP unicast packets to travel from one customer site to another. The unicast VPN services defined in RFC 4364 and RFC 4659 can be extended to include the capability of handling IP multicast traffic, using the techniques disclosed in RFC 6513, entitled "Multicast in MPLS/BGP IP VPNs," which is incorporated by reference herein. VPNs configured in accordance with RFC 6513 are considered examples of what are more generally referred to herein as multicast VPNs (MVPNs). Such MVPNs are typically configured to support the transmission of IP multicast packets between customer sites using multicast tunnels.

SUMMARY

Conventional VPN arrangements of the type described above can lead to complications in certain situations, such as when a client associated with a given VPN is communicating with a virtual machine that is migrated within cloud infrastructure of a cloud service provider.

Illustrative embodiments of the present invention provide communication networks in which a given network device implements a gateway that operates in conjunction with gateways of respective other network devices to implement distributed network address translation functionality. Such arrangements help to avoid the above-noted complications associated with migration of virtual machines in cloud infrastructure of a cloud service provider, and can provide other advantages in a wide variety of different networking applications.

In one embodiment, a first network device is configured for communication with at least a second network device, and implements a gateway. The gateway may comprise, for example, a software gateway. The gateway is configured to receive a packet in a format of a first protocol and to determine if the packet includes an identifier of the gateway. If the received packet does not include the gateway identifier, the packet is forwarded in the format of the first protocol. If the received packet does include the gateway identifier, a network address translation operation is applied to reconfigure the packet in a format of a second protocol different than the first protocol, and the reconfigured packet is forwarded in the format of the second protocol. The first and second protocols may comprise Internet protocols such as IPv6 and IPv4, respectively.

By way of example, the gateway may determine if the received packet includes the gateway identifier by determining if the gateway identifier is encoded within a destination address of the received packet. In such an arrangement, the gateway identifier may be encoded in a portion of the destination address using extra address bits resulting from extending an IPv4 address to an IPv6 address.

In another embodiment, the gateway implemented by the first network device is configured to receive a packet in a format of a first protocol, to apply a network address translation operation to reconfigure the packet in a format of a second protocol different than the first protocol, and to forward the reconfigured packet in the format of the second protocol, wherein in conjunction with application of the network address translation operation an identifier of the gateway is inserted into the reconfigured packet.

The first and second network devices in some embodiments may comprise respective routers or other provider elements associated with an IP-MPLS network, although it is to be appreciated that numerous other types of network devices and communication networks may be used in other embodiments.

DETAILED DESCRIPTION

Illustrative embodiments of the invention will be described herein with reference to exemplary communication networks, network devices and associated communication protocols. It should be understood, however, that the invention is not limited to use with the particular arrangements described, but is instead more generally applicable to any communication network application in which it is desirable to provide improved performance by providing distributed network address translation functionality using gateways implemented in respective network devices.

Figure 1:
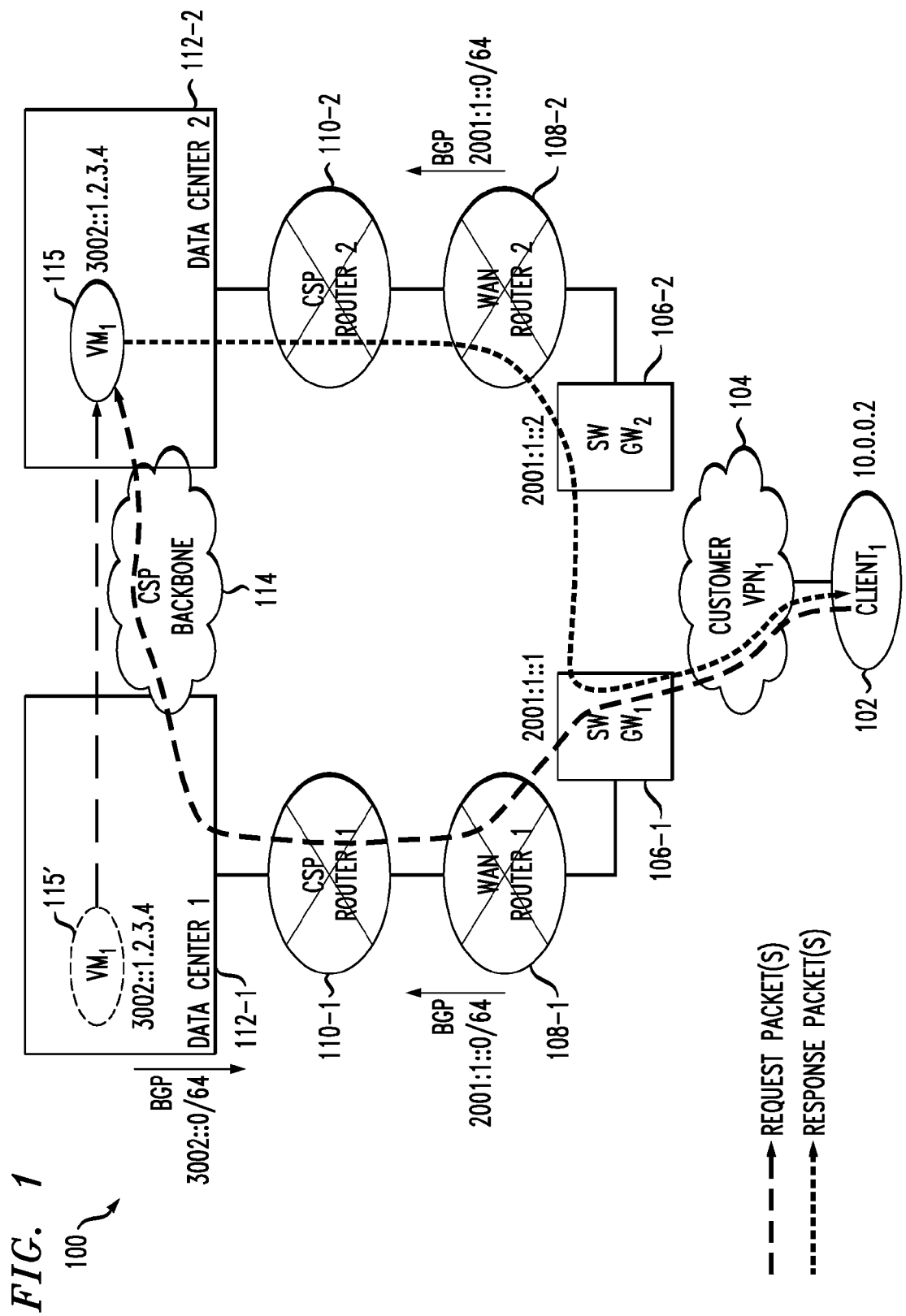
FIG. 1 shows a communication network that implements functionality for distributed network address translation in an illustrative embodiment of the invention.

FIG. 1 shows a communication network 100 that includes a client device 102, also denoted as Client$_1$. The client device 102 communicates over a customer VPN 104, also denoted as VPN$_1$, with first and second software gateways 106-1 and 106-2, also denoted as SW GW$_1$ and SW GW$_2$. The VPN 104 is also referred to herein as a customer VPN overlay network.

The software gateways 106-1 and 106-2 are coupled via respective wide area network (WAN) routers 108-1 and 108-2, also denoted as WAN Router 1 and WAN Router 2, to respective cloud service provider (CSP) routers 110-1 and 110-2, also denoted as CSP Router 1 and CSP Router 2. The WAN routers 108-1 and 108-2 are referred to elsewhere herein as WAN $R_1$ and WAN $R_2$, respectively.

The CSP routers 110-1 and 110-2 are coupled to respective CSP data centers 112-1 and 112-2 that communicate with one another over a CSP backbone network 114. The data centers 112-1 and 112-2 are also denoted as Data Center 1 and Data Center 2, respectively. Each such data center is assumed to implement cloud infrastructure including sets of virtual machines controlled by respective hypervisors running on underlying processing platforms or other physical infrastructure. The cloud infrastructure includes a virtual machine 115 denoted $VM_1$ that is assumed to be utilized by the client device 102. It is further assumed that during the course of its utilization by client device 102, the virtual machine $VM_1$ is migrated from a location in data center 112-1 as indicated by reference numeral 115' to a new location in data center 112-2.

In the FIG. 1 embodiment, the client has an IPv4 address 10.0.0.2, the software gateways 106-1 and 106-2 have respective IPv6 addresses 2001:1::1 and 2001:1::2, and the virtual machine has an IPv6 address 3002::1.2.3.4. The WAN routers 108 utilize BGP to advertise the IPv6 addresses of the software gateways 106, and at least one of the data centers 112 utilizes BGP to advertise the IPv6 address of the virtual machine 115, as indicated in the figure. The notation "/64" associated with the BGP messaging defines a subnet range and represents the number of bits in the prefix, in this case 64 bits out of a total of 128 bits in an IPv6 address. It is assumed in this example that the migration of the virtual machine from data center 112-1 to data center 112-2 does not alter its IPv6 address.

The WAN routers 108 represent IPv6-capable peering points within the communication network 100, and in this embodiment are peered with the respective CSP routers 110. The software gateways 106 may be deployed on respective ones of the WAN routers 108, or on other network devices.

As mentioned previously, migration of a virtual machine within cloud infrastructure in conventional practice can lead to undesired complications if the virtual machine is being utilized by a client of a VPN. For example, such migration can lead to inefficient routing when a client directs a request packet to a virtual machine in one location prior to migration but a corresponding response packet is directed back to the client from the new location of the migrated virtual machine.

This problematic situation resulting from virtual machine migration is avoided in the FIG. 1 embodiment by configuring gateways 106-1 and 106-2 to implement distributed network address translation functionality, as will be described in greater detail below in conjunction with FIGS. 2 through 6.

Advantageously, such functionality can be provided without the need to maintain state synchronization between the various gateways. Exemplary arrangements of this type may therefore also be referred to herein as providing "stateless" distributed network address translation functionality.

The gateways 106-1 and 106-2 are assumed to be implemented substantially entirely in the form of software running on respective network devices. Such network devices may comprise, for example, routers, switches, computers, appliances or other processing devices, in any combination.

A given network device will generally comprise a processor and a memory coupled to the processor, as well as one or more transceivers or other types of network interface circuitry which allow the network device to communicate with the other network devices. Elements such as routers 108 and 110 in the FIG. 1 embodiment may be considered examples of what are more generally referred to herein as "network devices."

Although the gateways 106-1 and 106-2 are illustratively implemented as software gateways in the present embodiment, such gateways may alternatively be implemented as separate hardware devices in other embodiments, or as various combinations of hardware, software and firmware. The gateways may be implemented, for example, on respective ones of the WAN routers 108, or on provider edge (PE) routers of the customer VPN 104.

Alternatively, the gateways may be implemented as respective separate network appliances, or possibly on servers, hypervisors or other network components. Hardware acceleration may be used in some embodiments when implementing the gateways. The term "gateway" as used herein is intended to be broadly construed so as to encompass these and other possible implementations.

The gateways 106 in the present embodiment direct packets between respective ones of the WAN routers 108 and the VPN 104. Moreover, the gateways can communicate packets between one another.

Exemplary routing paths associated with respective sets of request and response packets are shown in FIG. 1 by different styles of dashed lines. It can be seen that one or more request packets are routed from client device 102 over VPN 104 through software gateway 106-1, WAN router 108-1, CSP router 110-1 and CSP backbone network 114 to the migrated virtual machine 115 in data center 112-2.

One or more corresponding response packets are routed from virtual machine 115 in data center 112-2 via CSP router 110-2 and WAN router 108-2 to software gateway 106-2. The software gateway 106-2 implements processing to be described below that advantageously results in the one or more response packets being directed from software gateway 106-2 to software gateway 106-1 instead of into the VPN 104, thereby avoiding possible inefficient routing from software gateway 106-2 to client device 102 through VPN 104. The software gateway 106-1 then directs the one or more response packets through VPN 104 to client device 102. This can provide significantly improved routing efficiency in the presence of migration of virtual machine 115. Moreover, routing of the one or more response packets back to software gateway 106-1 from software gateway 106-2 ensures that operation of an instance of a stateful firewall will not be adversely impacted by the migration of the virtual machine 115, in embodiments that utilize such firewalls to protect the customer VPN 104 against unauthorized packets.

As mentioned above, it is assumed in this embodiment that the client device 102 utilizes IPv4 addressing, and illustratively has an IPv4 source address given by 10.0.0.2. For outgoing request packets from the VPN 104 that utilize IPv4 addressing, each of the software gateways 106-1 and 106-2 is configured to extend the IPv4 source address to an IPv6 source address. This address extension results in extra address bits that each software gateway uses to encode its corresponding identifier. Accordingly, a request packet with an IPv4 source address received over VPN 104 is reconfigured to include an IPv6 source address that incorporates an identifier of the software gateway through which the request packet is routed. As noted previously, this facilitates subsequent routing of a corresponding response packet in the event of migration of virtual machine 115 within the cloud infrastructure comprising data centers 112.

The above-described processing of a request packet received in one of the software gateways 106 from the VPN 104 may be viewed as an example of a more general arrangement in which the gateway receives a packet in a format of a first protocol, applies a network address translation operation to reconfigure the packet in a format of a second protocol different than the first protocol, and forwards the reconfigured packet in the format of the second protocol, wherein in conjunction with application of the network address translation operation an identifier of the gateway is inserted into the reconfigured packet.

In the context of this request packet example, the first protocol comprises IPv4 and the second protocol comprises IPv6, and the network address translation is a type of IPv4 to IPv6 network address translation. The gateway identifier is encoded in a portion of the source address of the request packet using the extra address bits resulting from extending an IPv4 address to an IPv6 address. Other types of protocols, network address translation and encodings can be used in other embodiments.

For incoming response packets from the VPN 104 that utilize IPv6 addressing, each of the software gateways 106-1 and 106-2 is configured to process the IPv6 source address to determine if it includes an identifier of that gateway. In the FIG. 1 embodiment, a response packet received at software gateway 106-2 will not include the identifier of that gateway because the corresponding request packet did not originate from that gateway. The response packet is therefore forwarded as an IPv6 packet from the software gateway 106-2 to the software gateway 106-1. The software gateway 106-1 will process the received response packet and upon determining that it does include its corresponding gateway identifier, will reconfigure the packet as an IPv4 packet and forward the reconfigured packet through VPN 104 to the client device 102.

The above-described processing of a response packet received in one of the software gateways 106 from the VPN 104 may be viewed as an example of a more general arrangement in which the gateway receives a packet in a format of a first protocol and determines if the packet includes an identifier of the gateway. If the received packet does not include the gateway identifier, the packet is forwarded in the format of the first protocol. If the received packet does include the gateway identifier, a network address translation operation is applied to reconfigure the packet in a format of a second protocol different than the first protocol, and the reconfigured packet is forwarded in the format of the second protocol.

In the context of this response packet example, the first protocol comprises IPv6 and the second protocol comprises IPv4, and the network address translation is a type of IPv6 to IPv4 network address translation. The gateway identifier is encoded in a portion of the destination address of the response packet using the above-noted extra address bits. Again, other types of protocols, network address translation and encodings can be used in other embodiments.

Figure 2:
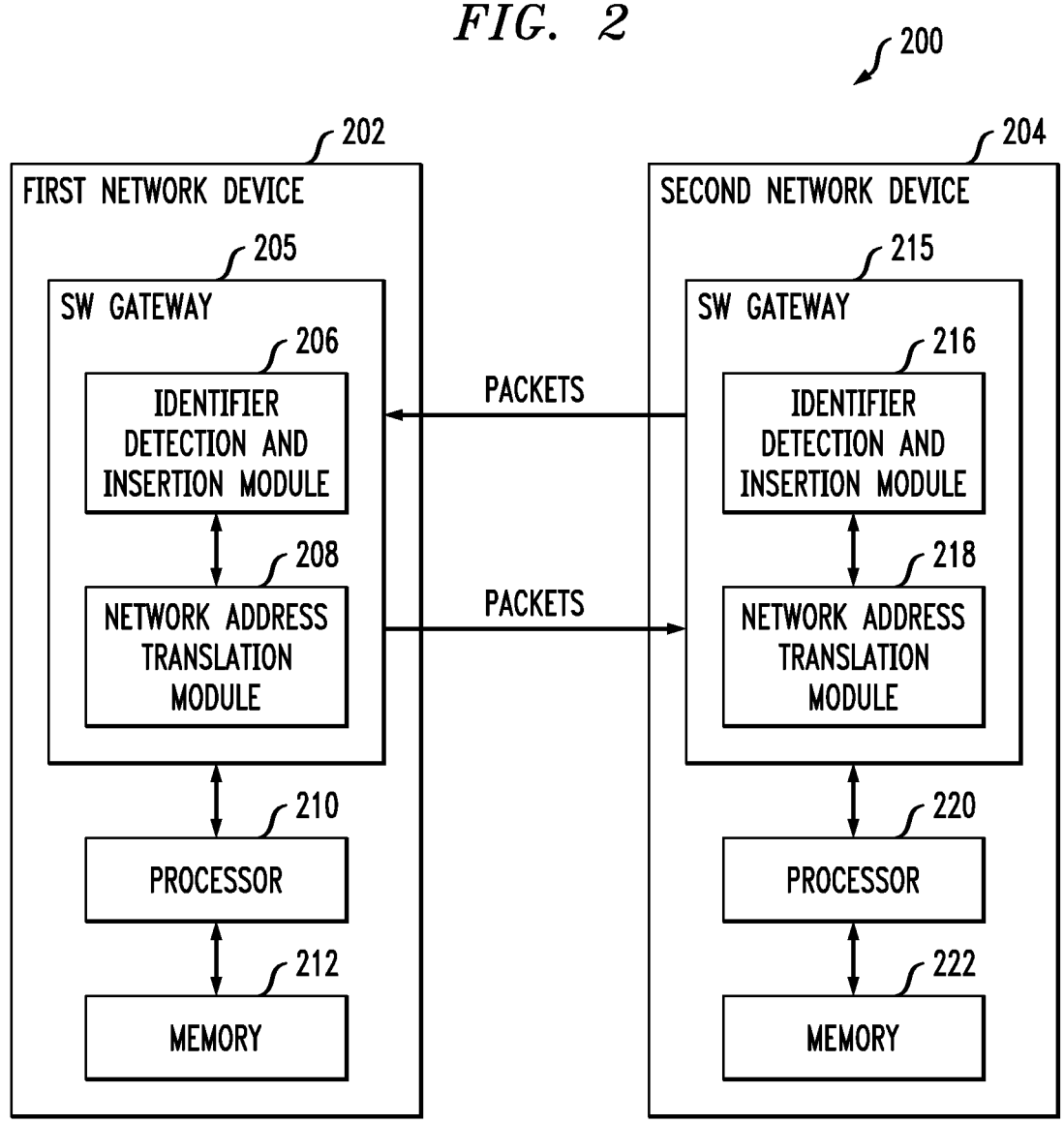
FIG. 2 is a more detailed view of first and second network devices in one possible implementation of the FIG. 1 communication network.

Referring now to FIG. 2, a more detailed view of first and second network devices in one possible implementation of the communication network 100 is shown. In this embodiment, a portion 200 of network 100 illustratively includes first and second network devices 202 and 204 which may correspond to respective ones of the WAN routers 108-1 and 108-2 or other types of network devices, such as respective PE routers associated with the VPN 104, or respective network appliances.

The first network device 202 is adapted for communication with the second network device 204, and vice versa. The first network device 202 comprises a software gateway 205 that includes an identifier detection and insertion module 206 coupled to a network address translation module 208. The first network device 202 further comprises a processor 210 coupled to a memory 212. The second network device 204 comprises a software gateway 215 that includes an identifier detection and insertion module 216 coupled to a network address translation module 218. The second network device 204 further comprises a processor 220 coupled to a memory 222.

It is assumed in the FIG. 2 embodiment that the processors 210 and 220 are configured to direct the operation of the corresponding software gateways 205 and 215 by executing software that is stored in the memories 212 and 222. Although shown as separate from the respective processors 210 and 220 in the figure, the software gateways 205 and 215 may execute entirely on those processors.

The network devices 202 and 204 will also generally include network interface circuitry to allow these devices to communicate with one another. Such transceiver circuitry will generally include conventional transceivers as well as other related circuitry used to support communication using IP and other protocols mentioned herein.

The processors 210 and 220 of respective network devices 202 and 204 may each be implemented utilizing a microprocessor, a microcontroller, an application-specific integrated circuit (ASIC), a field-programmable gate array (FPGA), or other type of processing circuitry, as well as portions or combinations of such processing circuitry. A given such processor may include one or more embedded memories as internal memories.

As indicated above, the processor 210 or 220 and any associated internal or external memory may be used in storage and execution of one or more software programs for controlling the operation of the corresponding network device 202 or 204. Accordingly, one or more of the modules 206 and 208 of software gateway 205 in network device 202, one or more of the modules 216 and 218 of software gateway 215 in network device 204, or portions of these modules, may be implemented at least in part using such software programs.

Each of the memories 212 and 222 of the network devices 202 and 204 is assumed to include one or more storage areas that may be utilized for program code storage. The memory 212 or 222 may therefore be viewed as an example of what is more generally referred to herein as a computer program product or still more generally as a computer-readable storage medium that has executable program code embodied therein. Other examples of computer-readable storage media may include disks or other types of magnetic or optical media, in any combination. Articles of manufacture comprising such computer program products or other computer-readable storage media are considered embodiments of the invention.

The memory 212 or 222 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The processor, memory, transceiver and other components of a given network device of communication network 100 may include well-known circuitry suitably modified to implement at least a portion of the distributed network address translation functionality described above. Conventional aspects of such circuitry are well known to those skilled in the art and therefore will not be described in detail herein.

It is to be appreciated that the particular arrangement of network device components shown in FIG. 2 is exemplary only, and numerous alternative network device configurations may be used in other embodiments. For example, the network devices can be configured to incorporate additional or alternative components and to support other communication protocols.

Figure 3:
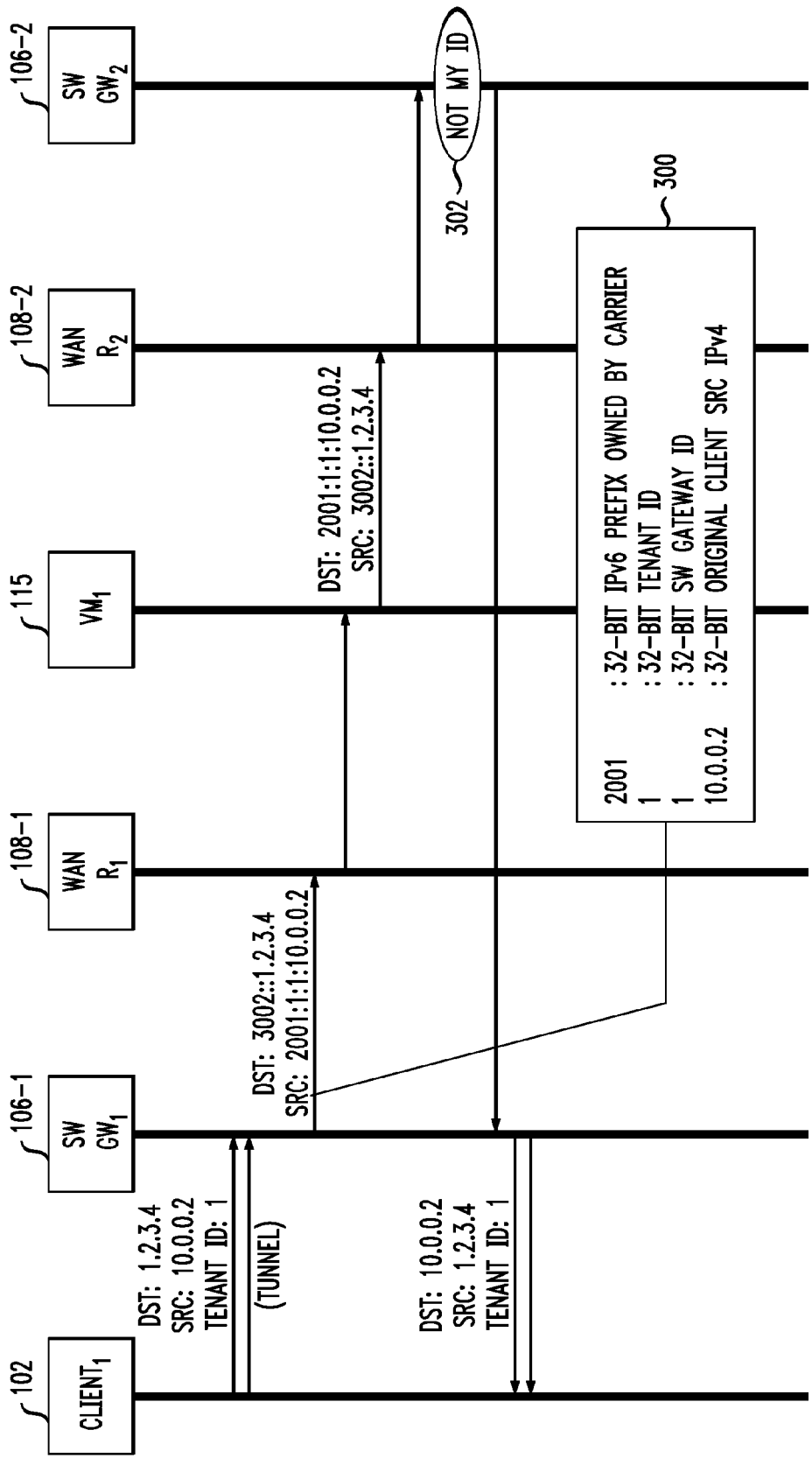
FIG. 3 illustrates a first example of packet processing in the FIG. 1 communication network.

An example of packet processing implemented in the FIG. 1 communication network is illustrated in FIG. 3. In this example, a request packet directed from the client 102 to the virtual machine 115 has as its source address the IPv4 address 10.0.0.2 of the client and has as its destination address the IPv4 address 1.2.3.4 of the virtual machine 115. The packet is initially carried through VPN 104 using a tunnel that is mapped to a particular tenant identifier or Tenant ID. The tunnel may be, for example, a virtual extensible LAN (VXLAN) tunnel or generic routing encapsulation (GRE) tunnel, although other types of tunnels may be used in other embodiments.

The Tenant ID is used to separate network traffic from different VPNs, and in this example it is more particularly assumed that for the VPN 104, the Tenant ID=1. Other types of mappings can be used in other embodiments. For example, the Tenant ID may alternatively map to a VLAN tag, one or more MPLS labels, a physical port ID on the gateway, an outer IP address for IP-in-IP tunneling, etc. The Tenant ID may also map to a number of different tunnel IDs, with these tunnel IDs being unique for each pair of network endpoints between which they are used.

The software gateways 106-1 and 106-2 are each assumed to terminate one or more VXLAN or GRE tunnels from one or more customer VPN overlay networks such as customer VPN 104.

In the FIG. 3 packet processing, the software gateway 106-1 terminates the tunnel associated with Tenant ID=1 as indicated. As mentioned previously in conjunction with FIG. 1, the WAN routers 108 utilize BGP to advertise the respective IPv6 addresses 2001:1::1 and 2001:1::2 of the software gateways 106-1 and 106-2, and at least one of the data centers 112 utilizes BGP to advertise the IPv6 address 3002::1.2.3.4 of the virtual machine 115.

As illustrated in FIG. 3, the software gateway 106-1 receives the request packet in an IPv4 format and reconfigures the request packet into an IPv6 format. More particularly, an IPv4 to IPv6 network address translation operation is applied to the request packet that involves inserting an identifier of the gateway 106-1 into the reconfigured packet. An encoding 300 of the source address of the reconfigured packet as performed by software gateway 106-1 is illustrated in the figure, and encodes the gateway identifier in a portion of the source address using extra address bits resulting from extending an IPv4 address to an IPv6 address.

More particularly, the encoding 300 provides the request packet with an IPv6 source address 2001:1:1:10.0.0.2, where 2001 denotes a 32-bit IPv6 prefix owned by a carrier or other service provider implementing the software gateways 106, the next field is a 32-bit Tenant ID=1, the next field is a 32-bit Gateway ID=1, and the final field includes the original IPv4 source address 10.0.0.2 of the client 102. The software gateway 106-1 also adjusts the destination address of the packet to correspond to the IPv6 address 3002::1.2.3.4 of the virtual machine 115.

In the present embodiment, the software gateway 106-1 uses the encoding 300 to encode 128 bits of an IPv6 source address for each request packet coming from customer VPN 104 that is directed to an IPv4 address. The result of the encoding is an example of what is more generally referred to herein as a "reconfigured packet." Such a packet in the present embodiment has its source address adjusted to incorporate an identifier of the originating software gateway of the packet, although other types of reconfigured packets may be used in other embodiments. Terms such as "reconfigured" and "reconfiguring" as used herein are therefore intended to be broadly construed, so as to encompass, for example, generation of a new packet as well as adjustment of one or more fields in a given existing packet.

The reconfigured packet from software gateway 106-1 is delivered to the virtual machine 115 via the WAN router 108-1, CSP router 110-1 and CSP backbone network 114 as previously described in conjunction with FIG. 1. The CSP router and CSP backbone network are not shown in FIG. 3 for simplicity and clarity of illustration.

The virtual machine 115 processes the request packet and generates a corresponding response packet that has as its destination address the IPv6 address 2001:1:1:10.0.0.2 and as its source address the IPv6 address 3002::1.2.3.4 of the virtual machine. This response packet is delivered via the CSP router 110-2 and WAN router 108-2 to the software gateway 106-2 as previously described in conjunction with FIG. 1. The software gateway 106-2 processes the received packet to determine if it includes its identifier encoded in the IPv6 destination address.

In the present embodiment, the destination address includes an identifier of the software gateway 106-1, and not an identifier of the software gateway 106-2. The software gateway 106-2 therefore determines as indicated at 302 that the packet does not include its gateway identifier, and forwards the packet in its IPv6 format to the software gateway 106-1 as shown.

Accordingly, a given software gateway deployed on or in association with a corresponding peering point can accept IPv6 return traffic, and if it is not the originating gateway for that traffic can forward it to the originating gateway.

The software gateway 106-1 upon receiving the response packet from the software gateway 106-2 determines that the packet includes its gateway identifier encoded in the IPv6 destination address. The software gateway 106-1 then applies a network address translation operation to reconfigure the packet in an IPv4 format, which includes as its destination address the IPv4 address 10.0.0.2 of the client 102 and as its source address the IPv4 address 1.2.3.4 of the virtual machine 115, and forwards the resulting reconfigured packet over the VPN corresponding to the appropriate Tenant ID.

Figure 4:
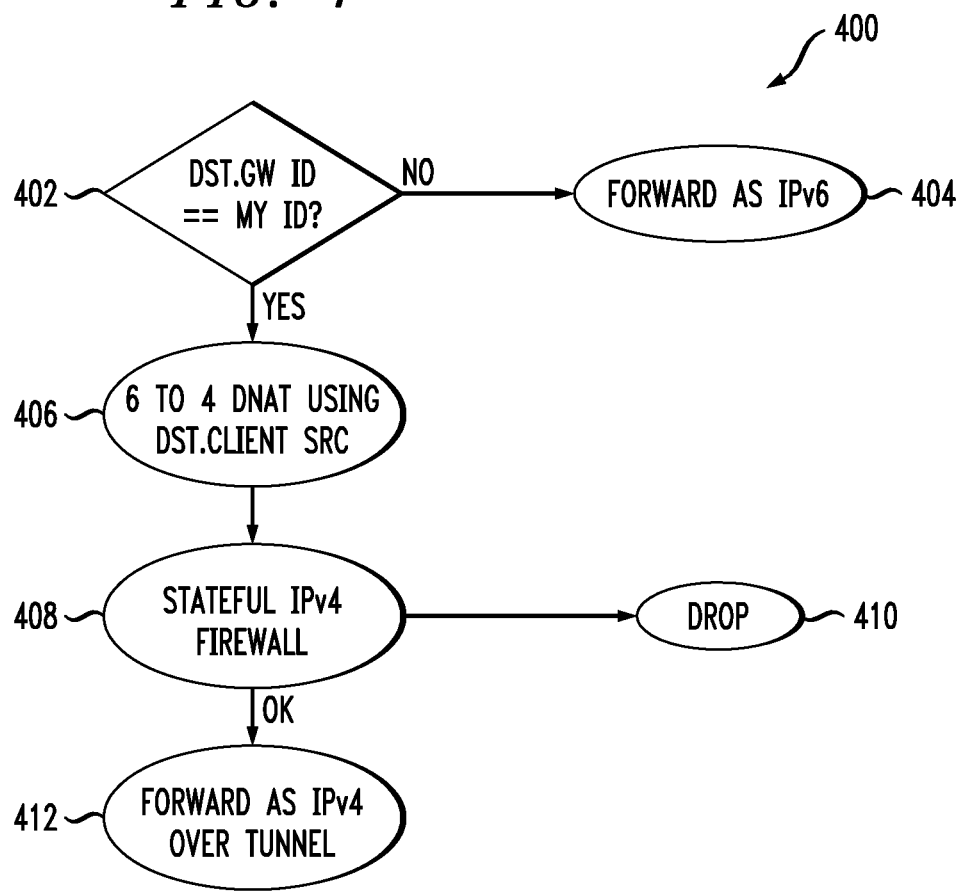
FIG. 4 is a flow diagram of a gateway portion of the FIG. 3 packet processing.

Exemplary processing implemented by the software gateways 106 is shown in the flow diagram of FIG. 4. Each of the software gateways 106 implements its own instance of process 400. In a given instance of the process 400, the software gateway in step 402 determines for a given received response packet whether or not the IPv6 destination address includes its gateway identifier. If the packet does not include the identifier of the receiving gateway, the gateway forwards the packet as an IPv6 packet as indicated in step 404. In the context of the FIG. 3 embodiment, the software gateway 106-2 receives an IPv6 packet in which the destination address is given by:

<prefix=2001, tenant ID=1, gateway ID=1, client src IPv4=10.0.0.2>.

In applying step 402 of its instance of process 400, the software gateway 106-2 reaches a negative determination, and the packet is forwarded as an IPv6 packet from the software gateway 106-2 to the software gateway 106-1. The software gateway 106-1 reaches an affirmative determination when applying step 402 of its instance of process 400, and therefore proceeds to execution of step 406.

In step 406, an IPv6 to IPv4 network address translation operation is implemented in the manner previously described.

The resulting packet includes as its destination address the IPv4 address of the original client source. This network address translation operation is an example of what is referred to herein as a distributed network address translation operation or DNAT operation, as it is based at least in part on an assumed cooperation between multiple distributed software gateways 106.

In step 408, the software gateway 106-1 performs one or more operations associated with a stateful IPv4 firewall. This results in either dropping of the packet as indicated in step 410, or forwarding of the packet as an IPv4 packet to client 102 over a tunnel associated with Tenant ID=1 as indicated in step 412. To recover from intermittent failures, a given software gateway may be configured such that the stateful firewall will accept ongoing flows as valid for a limited period of time after reboot, in order to allow existing flows to survive by reconstructing their state. Additional or alternative operations that may be performed by software gateway 106-1 include network functions such as load balancing, WAN optimization, etc.

Figure 5:
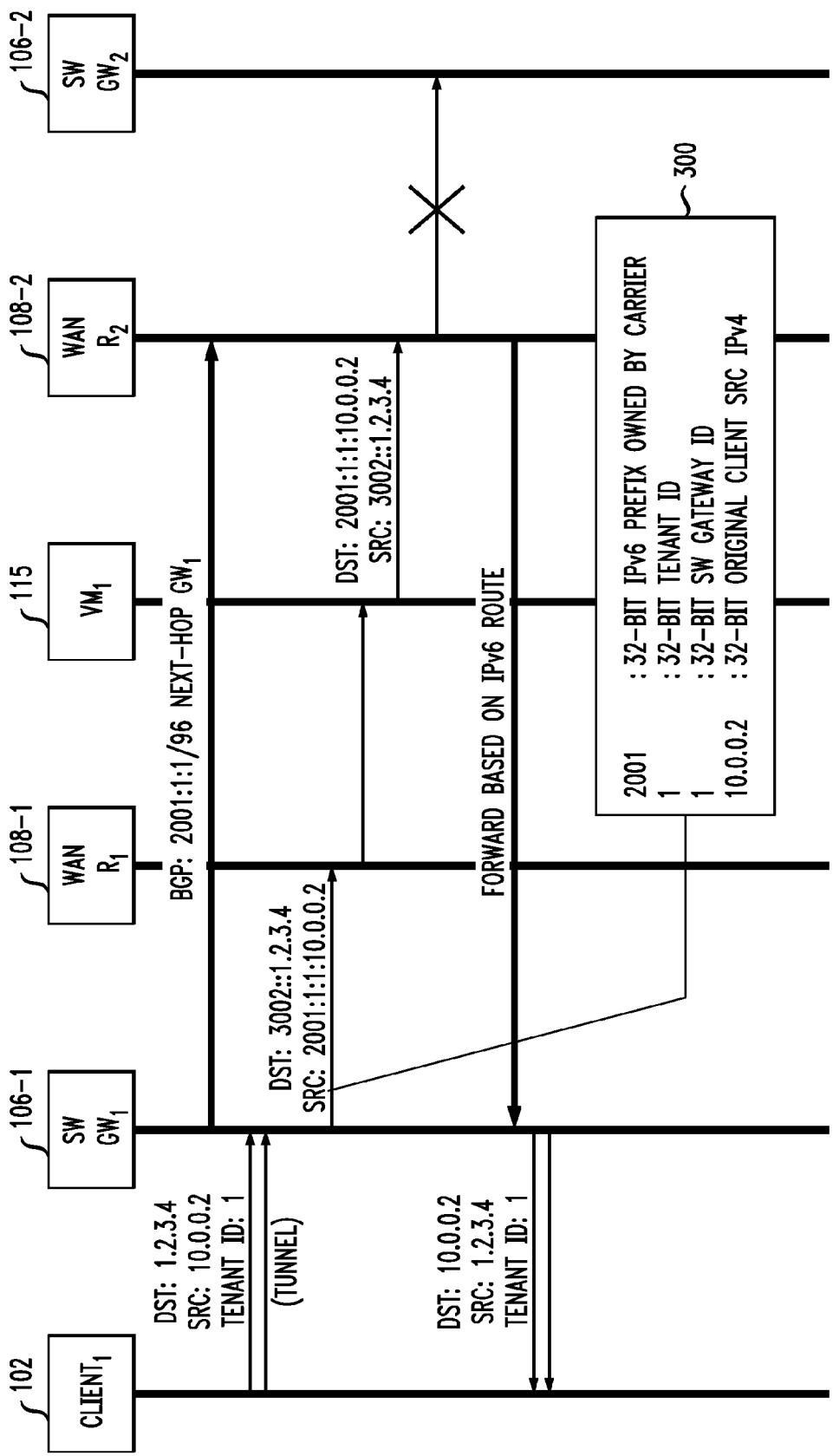
FIG. 5 illustrates a second example of packet processing in the FIG. 1 communication network.
Figure 6:
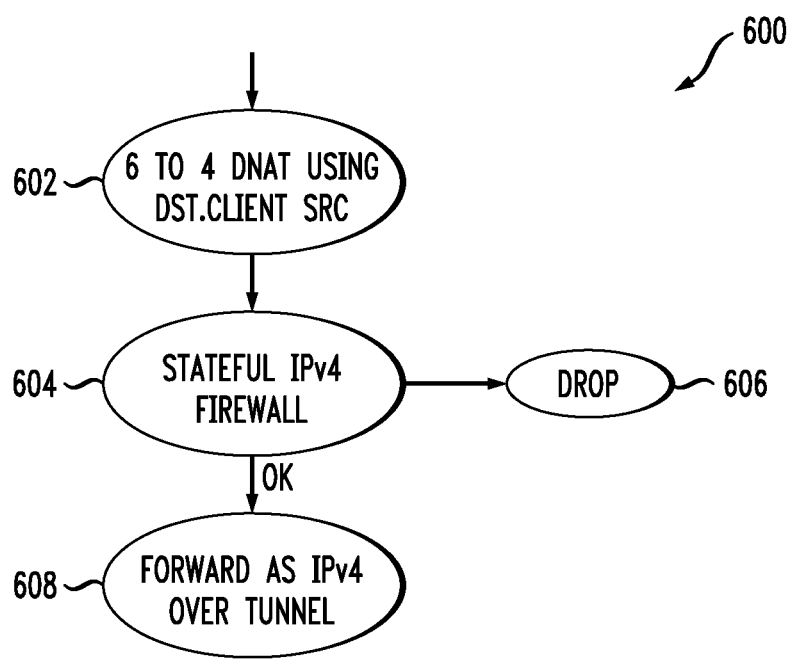
FIG. 6 is a flow diagram of a gateway portion of the FIG. 5 packet processing.

FIGS. 5 and 6 illustrate another example of packet processing that may be implemented in the communication network of FIG. 1.

With reference initially to FIG. 5, the software gateway 106-1 implements the encoding 300 of the IPv6 source address of a request packet as previously described. In addition, the software gateway 106-1 exports a specific IPv6 route through BGP to the WAN router 108-2 as indicated. This may be done directly by the software gateway or by other network components operating on its behalf. The specific IPv6 route indicates that the next hop for the corresponding response packet when received at the WAN router 108-2 is the software gateway 106-1 rather than the software gateway 106-2. Accordingly, the WAN router 108-2 forwards the received packet back to the software gateway 106-1 as indicated, such that the software gateway 106-2 does not need to check the packet for its gateway identifier.

The IPv6 route in FIG. 5 is designated as 2001:1:1/96, where the notation "/96" defines a subnet range and represents the number of bits in the prefix. Thus, this IPv6 route has a prefix length of 96 bits, with the remaining 128−96=32 bits being used to ensure that any embedded 32-bit client IPv4 address routes back to the gateway 106-1.

FIG. 6 shows the corresponding packet processing implemented within each of the software gateways 106. Again, each of the software gateways 106 implements its own instance of process 600. In a given instance of the process 600, the software gateway in step 602 performs the IPv6 to IPv4 network address translation, and then applies a stateful IPv4 firewall in step 604. This results in either dropping of the packet as indicated in step 606, or forwarding of the packet as an IPv4 packet to client 102 over a tunnel associated with Tenant ID=1 as indicated in step 608. The FIG. 6 process therefore corresponds to the FIG. 4 process but with steps 402 and 404 eliminated.

It should be noted with regard to the embodiment of FIGS. 5 and 6 that the presence of BGP filtering should be taken into account in implementing such an embodiment. For example, depending on the particular deployment and its associated policies, a given WAN router may not be configured to accept routes with large prefixes directed towards relatively small subnets.

The particular packet processing steps and operations described above in conjunction with the diagrams of FIGS. 3 to 6 are exemplary only, and additional or alternative steps or operations may be used in other embodiments.

Also, although the embodiments of FIGS. 3 to 6 encode a gateway identifier in a reconfigured packet, other embodiments can utilize a reconfigured packet to carry other additional or alternative information not ordinarily conveyed in an IPv6 address. The extra address bits resulting from extending an IPv4 address to an IPv6 address can therefore be used for other purposes in other embodiments.

For example, these bits can be used to mark end-to-end flows for provision of differentiated services across domains. This can provide advantages over conventional diffserv markings which may get lost at intermediate points, and which do not guarantee that response packets have the same marking as request packets.

As another example, the extra address bits can be used to embed a timestamp to analyze how long a given flow has existed in the network, and to derive statistics on flow lifetime distributions.

It is also possible to use the extra bits to insert a bit mask for service chaining, instructing downstream elements how to treat packets of a given flow. Such instructions may include instructions regarding whether or not to pass the packets through certain network functions such as a firewall, distributed denial of service (DDoS) analyzer, WAN optimizer, TCP optimizer, caching, compression, etc.

The extra address bits can additionally or alternatively be used to mark flows that have been validated or otherwise approved versus other flows that have not, and to mark flows for special analysis such as legal intercept, visualization, etc.

As yet another example, varying bits could be inserted in packet flows between a pair of gateways (e.g., an IPv4 flow comes in at gateway 1, goes out as an IPv6 flow to gateway 2, and is then converted back to an IPv4 flow). Different bits could be inserted in each packet in order to perform non-obtrusive timing or packet loss measurements on the IPv6 flow. Such arrangements could be particularly useful in the case of user datagram protocol (UDP) packets.

As mentioned above, embodiments of the present invention may be implemented in the form of articles of manufacture each comprising one or more software programs that are executed by processing circuitry of a network device or other processing device of a communication network.

Also, embodiments of the present invention may be implemented in one or more ASICs, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing embodiments of the invention.

Although certain illustrative embodiments are described herein in the context of communication networks utilizing particular communication protocols such as IP, BGP and MPLS, other types of networks can be used in other embodiments. As noted above, the term "network" as used herein is therefore intended to be broadly construed.

These and other embodiments of the present invention provide numerous advantages relative to conventional arrangements. For example, embodiments disclosed herein can help to avoid the above-noted complications associated with migration of virtual machines in cloud infrastructure of a cloud service provider, and can provide other advantages in a wide variety of different networking applications. One or more such embodiments implement stateless distributed network address translation, facilitating the provision of efficient routing between cloud infrastructure and customer VPNs while utilizing standard IPv6 functionality of the cloud service provider. As mentioned previously, there is no requirement that state synchronization be maintained between the various gateways. This allows the gateways not only to scale easily in number, but also to recover quickly from intermittent failures without breaking ongoing flows.

It should again be emphasized that the embodiments described above are for purposes of illustration only, and should not be interpreted as limiting in any way. Other embodiments may use different types of network, device and module configurations, and alternative communication protocols, process steps and operations for implementing distributed address translation functionality. The particular manner in which a gateway identifier and possibly additional or alternative information are encoded in an address or other portion of a given packet can be varied in other embodiments. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. An apparatus comprising:
a first network device configured for communication with at least a second network device;
the first network device implementing a first gateway;
wherein the first gateway is configured:
to receive a packet in a format of a first protocol;
to determine if the packet includes an identifier of the first gateway;
if the packet does not include the identifier of the first gateway, to forward the packet in the format of the first protocol to a second gateway having an identifier that is different than the identifier of the first gateway; and
if the packet includes the identifier of the first gateway, to apply a network address translation operation to reconfigure the packet in a format of a second protocol different than the first protocol and to forward the reconfigured packet in the format of the second protocol;
wherein the identifiers of the first and second gateways comprise respective unique portions of network addresses of the respective first and second gateways; and
wherein the network addresses of the respective first and second gateways share a common prefix portion.

2. The apparatus of claim 1 wherein the first protocol comprises IPv6 and the second protocol comprises IPv4.

3. The apparatus of claim 2 wherein forwarding the packet in the format of the first protocol comprises forwarding the packet to a destination identified by an IPv6 destination address of the received packet.

4. The apparatus of claim 2 wherein the network address translation operation comprises IPv6 to IPv4 network address translation.

5. The apparatus of claim 4 wherein the IPv6 to IPv4 network address translation identifies an IPv4 source address within the received packet.

6. The apparatus of claim 5 wherein forwarding the packet in the format of the second protocol comprises forwarding the packet to a destination identified by the IPv4 source address.

7. The apparatus of claim 1 wherein the first gateway determines if the received packet includes the identifier of the first gateway by determining if the identifier of the first gateway is encoded within a destination address of the received packet.

8. The apparatus of claim 7 wherein the identifier of the first gateway is encoded in a portion of the destination address using extra address bits resulting from extending an IPv4 address to an IPv6 address.

9. The apparatus of claim 8 wherein the destination address of the received packet comprises:
a first portion comprising the identifier of the first gateway;
a second portion comprising an IPv4 source address; and
a third portion comprising an IPv6 prefix.

10. The apparatus of claim 9 wherein the first, second and third portions comprise respective 32-bit fields of the destination address of the received packet.

11. The apparatus of claim 8 wherein the destination address of the received packet further comprises at least one additional portion conveying additional information not ordinarily conveyed in an IPv6 address.

12. The apparatus of claim 11 wherein said at least one additional portion comprises a tenant identifier for a particular virtual private network.

13. The apparatus of claim 1 wherein the first gateway comprises a software gateway implemented substantially entirely in software running on a processor of the first network device.

14. A communication network comprising the apparatus of claim 1.

15. The apparatus of claim 1 wherein the identifier of the first gateway comprises a designated portion of an Internet Protocol (IP) address of the first gateway.

16. The apparatus of claim 1 wherein a packet that does not include the identifier of the first gateway includes the identifier of the second gateway.

17. A method comprising:
receiving in a first gateway a packet in a format of a first protocol;
determining if the packet includes an identifier of the first gateway;
if the packet does not include the identifier of the first gateway, forwarding the packet in the format of the first protocol to a second gateway having an identifier that is different than the identifier of the first gateway; and
if the packet includes the identifier of the first gateway, applying a network address translation operation to reconfigure the packet in a format of a second protocol different than the first protocol and forwarding the reconfigured packet in the format of the second protocol;
wherein the identifiers of the first and second gateways comprise respective unique portions of network addresses of the respective first and second gateways;
wherein the network addresses of the respective first and second gateways share a common prefix portion; and
wherein the first gateway is implemented in a network device comprising a processor coupled to a memory.

18. The method of claim 17 wherein the first protocol comprises IPv6 and the second protocol comprises IPv4.

19. The method of claim 17 wherein determining if the packet includes the identifier of the first gateway comprises determining if the identifier of the first gateway is encoded within a destination address of the received packet.

20. An article of manufacture comprising a non-transitory processor-readable storage medium having embodied therein executable program code that when executed by the processor of the network device implementing the first gateway causes the network device to perform the method of claim 17.

21. An apparatus comprising:
a first network device configured for communication with at least a second network device;
the first network device implementing a first gateway;

wherein the first gateway is configured:
to receive a packet in a format of a first protocol;
to apply a network address translation operation to reconfigure the packet in a format of a second protocol different than the first protocol; and
to forward the reconfigured packet in the format of the second protocol;
wherein in conjunction with application of the network address translation operation an identifier of the first gateway is inserted into the reconfigured packet;
wherein the identifier of the first gateway distinguishes the first gateway from a second gateway having an identifier that is different than the identifier of the first gateway;
wherein the identifiers of the first and second gateways comprise respective unique portions of network addresses of the respective first and second gateways; and
wherein the network addresses of the respective first and second gateways share a common prefix portion.

22. The apparatus of claim 21 wherein the first protocol comprises IPv4 and the second protocol comprises IPv6.

23. The apparatus of claim 22 wherein the network address translation operation comprises IPv4 to IPv6 network address translation.

24. A communication network comprising the apparatus of claim 21.

25. A method comprising:
receiving in a first gateway a packet in a format of a first protocol;
applying a network address translation operation to reconfigure the packet in a format of a second protocol different than the first protocol; and
forwarding the reconfigured packet in the format of the second protocol;
wherein in conjunction with application of the network address translation operation an identifier of the first gateway is inserted into the reconfigured packet;
wherein the identifier of the first gateway distinguishes the first gateway from a second gateway having an identifier that is different than the identifier of the first gateway;
wherein the identifiers of the first and second gateways comprise respective unique portions of network addresses of the respective first and second gateways;
wherein the network addresses of the respective first and second gateways share a common prefix portion; and
wherein the first gateway is implemented in a network device comprising a processor coupled to a memory.

26. An article of manufacture comprising a non-transitory processor-readable storage medium having embodied therein executable program code that when executed by the processor of the network device implementing the first gateway causes the network device to perform the method of claim 25.

* * * * *